(12) United States Patent
Rengakuji et al.

(10) Patent No.: US 7,443,430 B2
(45) Date of Patent: Oct. 28, 2008

(54) IMAGE SENSING APPARATUS AND METHOD FOR CORRECTING SIGNAL FROM IMAGE SENSING DEVICE BY USING SIGNAL CORRECTION AMOUNT

(75) Inventors: Hideyuki Rengakuji, Tokyo (JP); Toshikazu Yanai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 803 days.

(21) Appl. No.: 10/957,508

(22) Filed: Oct. 1, 2004

(65) Prior Publication Data
US 2005/0073597 A1    Apr. 7, 2005

(30) Foreign Application Priority Data
Oct. 2, 2003    (JP)    ............... 2003-344373

(51) Int. Cl.
*H04N 5/217* (2006.01)
*H04N 5/335* (2006.01)
(52) U.S. Cl. .................... 348/241; 348/320
(58) Field of Classification Search ......... 348/241–251; 358/167, 213
See application file for complete search history.

(56) References Cited

U.S. PATENT DOCUMENTS 4,543,610 A * 9/1985 Ozawa et al. ............... 348/241
6,809,763 B1 * 10/2004 Yoshida ..................... 348/248
6,980,242 B2 * 12/2005 Funakoshi et al. .......... 348/245

FOREIGN PATENT DOCUMENTS

JP    3-35870 B2    5/1991
JP    2000-278609 A    10/2000

* cited by examiner

*Primary Examiner*—Lin Ye
*Assistant Examiner*—Trung Diep
(74) *Attorney, Agent, or Firm*—Morgan & Finnegan, LLP

(57) ABSTRACT

In an image sensing apparatus which uses a solid-state image sensing device, it is an object of the present invention to minimize smear. In order to achieve the object, a solid-state image sensing apparatus includes a solid-state image sensing device, a calculation unit which calculates a signal correction amount from an output signal from the solid-state image sensing device, an indication unit (even_odd_flag) which indicates whether the above output signal is output from an even-numbered line or odd-numbered line of the solid-state image sensing deice, the first correction unit which corrects the signal correction amount in accordance with the output from this indication unit, and the first subtraction unit which subtracts, from the above output signal, the signal correction amount corrected by the first correction unit.

8 Claims, 9 Drawing Sheets

IMAGE SENSING APPARATUS AND METHOD FOR CORRECTING SIGNAL FROM IMAGE SENSING DEVICE BY USING SIGNAL CORRECTION AMOUNT

FIELD OF THE INVENTION

The present invention relates to a solid-state image sensing apparatus which uses a solid-state image sensing device such as a CCD.

BACKGROUND OF THE INVENTION

In a solid-state image sensing apparatus which uses a CCD image sensing device, an image quality undesirably degrades because of a smear phenomenon which occurs when strong light enters, and a vertical stripe caused by a defective pixel as phenomena unique to the CCD image sensing device.

The image quality degradation by these causes depends on the characteristics of the CCD image sensing device. However, recently, the characteristics of the CCD image sensing device is difficult to be improved because of a reduction in unit pixel size and high sensitivity along with downsizing and a multi-pixel structure.

In order to suppress the image quality degradation by the above causes, for example, Japanese Patent Publication No. 3-35870 discloses a method of extracting a noise component from an output signal from an optical black pixel portion in a vertical direction of the solid-state image sensing device, storing the extracted noise component in a line memory, and subtracting the signal, which is read out from the line memory, from the signal in a continuous video period.

However, the multi-pixel solid-state image sensing apparatus used in a digital camera and the like often thins out lines in the vertical direction in order to improve a frame rate in an electronic viewfinder display or the like. As such thinning out, for example, a method disclosed in Japanese Patent Laid-Open No. 2000-278609 has been known. In this method, for example, when thinning out the vertical lines to ⅕, the vertical transfer stage counts of odd- and even-numbered lines are different from each other. As a result, a noise component amount of the odd-numbered line is different from that of the even-numbered line. In such thinning out, the noise component cannot be sufficiently suppressed in the above prior art, thus posing a problem.

Also, when blooming occurs in a video signal from the optical black pixel portion in the vertical direction of the solid-state image sensing device because of the irradiation of the strong light, the noise component is erroneously detected, and excessively corrected.

SUMMARY OF THE INVENTION

The present invention has been made in consideration of the above problems, and has as its object to minimize smear in an image sensing apparatus which uses a solid-state image sensing device.

In order to solve the above problems, and achieve the object, according to first aspect of the present invention, there is provided an image sensing apparatus comprising, an image sensing device which senses an image of an object, and a correction device which corrects a signal from the image sensing device by using a correction amount which changes depending on a horizontal line when a ratio between the number of signals to be added of the signals output from the image sensing device and the number of signals to be added of noise signals obtained by a dummy transfer changes depending on the horizontal line.

According to second aspect of the present invention, there is provided an image sensing method of an image sensing apparatus having an image sensing device with a plurality of pixels arranged in a horizontal direction and a vertical direction, comprising obtaining a correction amount by using a correction value which changes depending on a horizontal line, and correcting a signal from the image sensing device by using the correction amount, in an image sensing mode wherein a ratio between the number of signals to be added of the signals output from the image sensing device and the number of signals to be added of noise signals obtained by a dummy transfer changes depending on the horizontal line.

According to third aspect of the present invention, there is provided an image sensing apparatus comprising an indication device which indicates whether a signal from an image sensing device is output from an even-numbered line or odd-numbered line of the image sensing device, a calculation device which calculates a signal correction amount in accordance with an output from the indication device, and a correction device which corrects the signal output from the image sensing device by using the signal correction amount.

According to fourth aspect of the present invention, there is provided an image sensing method of an image sensing apparatus having an image sensing device, comprising calculating a signal correction amount in accordance with an indication whether a signal from the image sensing device is output from an even-numbered line or odd-numbered line of the image sensing device, and correcting the signal output from the image sensing device by using the signal correction amount.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

Preferred embodiments of the present invention will be described in detail below with reference to the accompanying drawings.

First Embodiment

Figure 1:
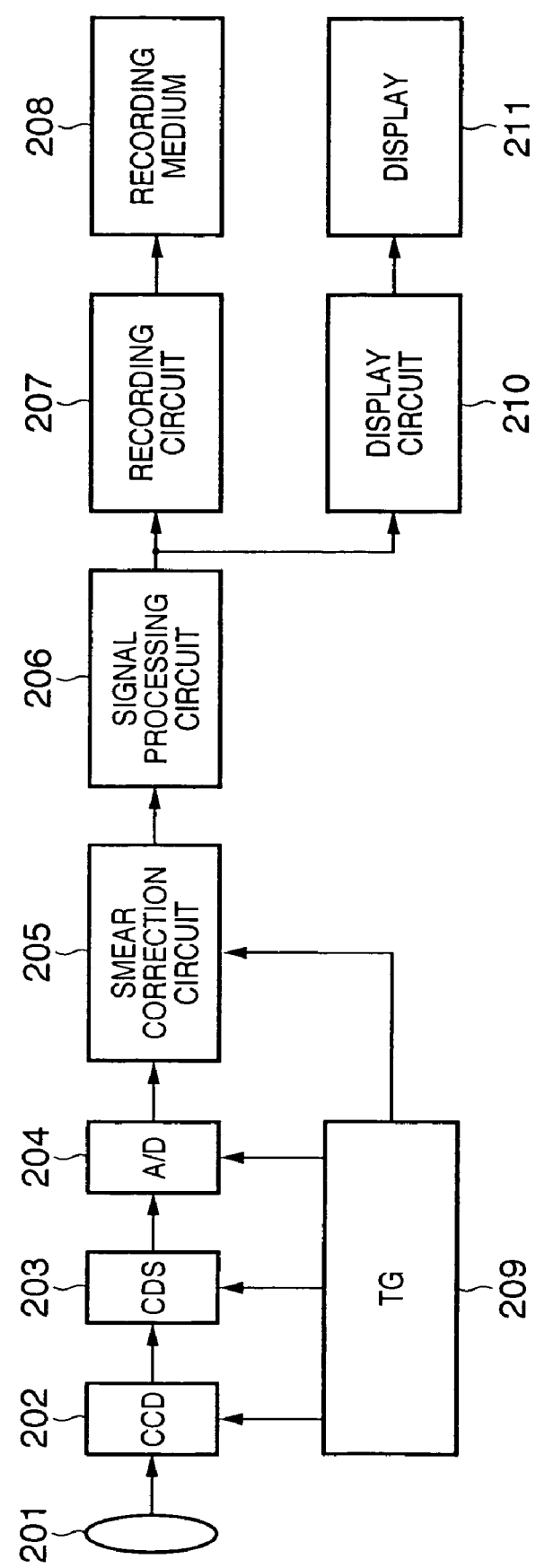
FIG. 1 is a block diagram of a solid-state image sensing apparatus including a smear correction circuit according to embodiments of the present invention.

FIG. 1 is a block diagram of a solid-state image sensing apparatus including a smear correction circuit according to an embodiment of the present invention.

As shown in FIG. 1, a light ray passing through an optical block 201 constituted by a photographing lens and the like is guided to the light-receiving surface of a CCD (solid-state image sensing device) 202. Hence, an image signal corresponding to an object is generated in a photodiode forming the light-receiving surface of the CCD 202.

A TG (timing generator) 209 drives the CCD 202 to output the image signal from the CCD 202, and the output image signal is input to a CDS (correlated double sampling hold) circuit 203. After that, in accordance with a timing signal defined by the TG 209, the CDS circuit 203 performs predetermined processing such as the removal of a reset noise for the image signal. The processed image signal is then sampled and held, and output to an A/D converter 204.

The A/D converter 204 A/D-converts the image signal in accordance with a clock signal supplied from the TG 209.

A smear correction circuit 205 performs smear correction of a pixel signal converted into a digital signal by the A/D converter 204 to output the corrected pixel signal. The operation of the smear correction circuit 205 will be described below.

The output from the smear correction circuit 205 is input to a signal processing circuit 206, and subjected to color conversion, white balance adjustment, and gamma correction. The output is converted into a luminance signal Y and color difference signals Cr and Cb.

A recording circuit 207 compresses the output from the signal processing circuit 206 to convert it into a predetermined format. The converted output is then recorded on a detachable recording medium 208.

The output from the signal processing circuit 206 is subjected to reduction/enlargement, superimposition, and the like, and converted into an NTSC analog signal or the like. The converted signal is then displayed on a display 211.

The operation of the smear correction circuit 205 will be described next.

Figure 2:
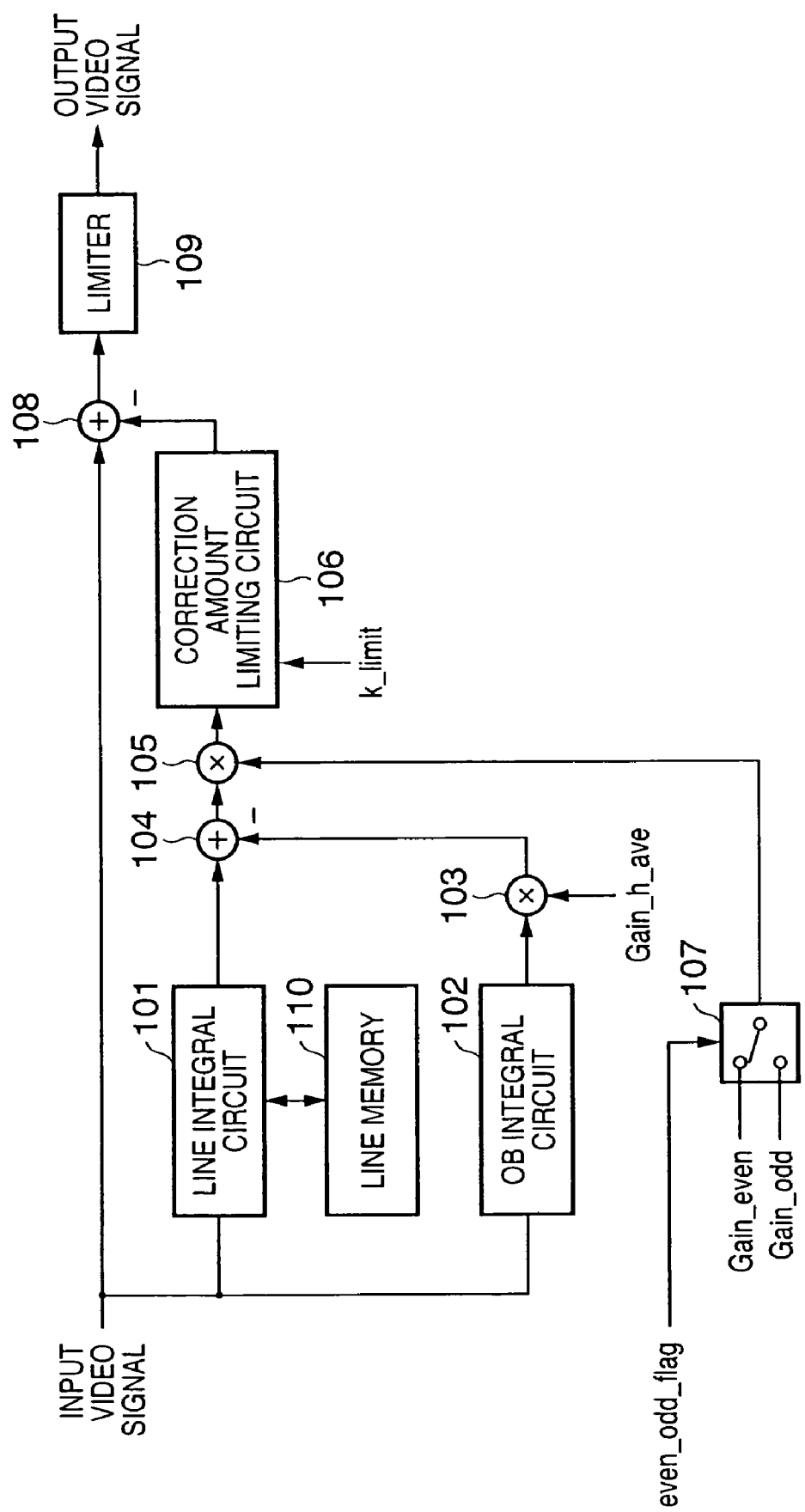
FIG. 2 is a block diagram showing an arrangement of the smear correction circuit according to the first embodiment of the present invention.

FIG. 2 is a block diagram showing an arrangement of the smear correction circuit according to the first embodiment of the present invention.

Figure 3:
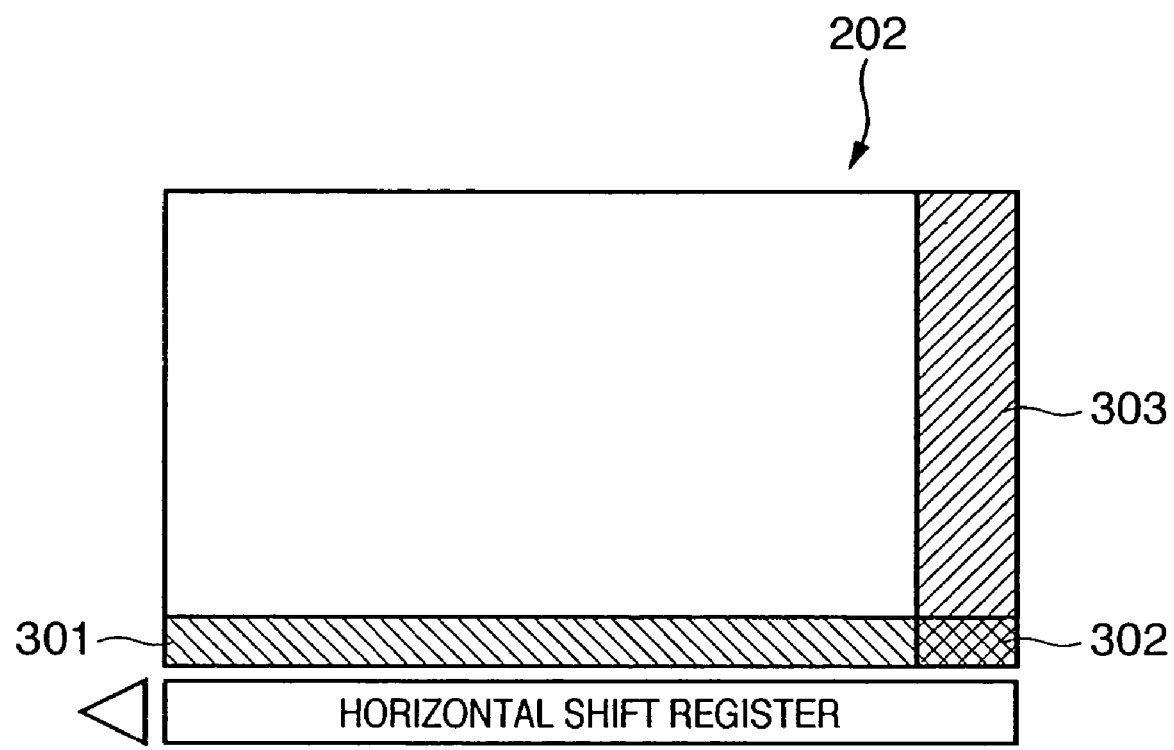
FIG. 3 is a view showing regions of a CCD 202.

With regard to an input video signal, the line integral circuit 101 line-integrates regions 301 and 302 in an optical black pixel line of the CCD 202 of the horizontal direction in FIG. 3 by using a line memory 110 to output the integral result. That is, the line memory 110 stores a fixed pattern noise signal of one line.

An OB integral circuit 102 integrates the region 302 corresponding to an optical black pixel portion of the horizontal direction in the region integrated by the line integral circuit 101 to output the integral result.

The region 302 does not have a smear signal since a vertical continuous region 303 also contains an optical black pixel.

A multiplier 103 multiplies the output from the OB integral circuit 102 by a coefficient Gain_h_ave to obtain the average in the horizontal direction.

For example, when the region 302 has 10 horizontal pixels, the coefficient Gain_h_ave is $\frac{1}{10}$.

A subtracter 104 subtracts the output from the multiplier 103 from the output result obtained by the line integral circuit 101.

That is, the output from the subtracter 104 is a signal obtained by performing optically black clamping to the fixed pattern noise signal.

A selection circuit (indication device) 107 selects a coefficient Gain_even or Gain_odd in accordance with a signal even_odd_flag supplied from the TG 209 to output the selected coefficient. The signal even_odd_flag represents whether the input video signal is the output obtained from an even- or odd-numbered line. The selection circuit 107 selects the coefficient Gain_even when the signal even_odd_flag represents that the input video signal is the output from the even-numbered line. Alternatively, the selection circuit 107 selects the coefficient Gain_odd when the signal even_odd_flag represents that the input video signal is the output from the odd-numbered line.

Each of the coefficients Gain_even and Gain_odd calculates a smear correction amount for the input video signal with reference to the output from the subtracter 104.

A multiplier (calculation device) 105 multiplies the output from the subtracter 104 by the coefficient selected by the selection circuit (indication device) 107, thereby calculating the different correction amounts for the input video signals of the odd- and even-numbered lines.

Figure 4:
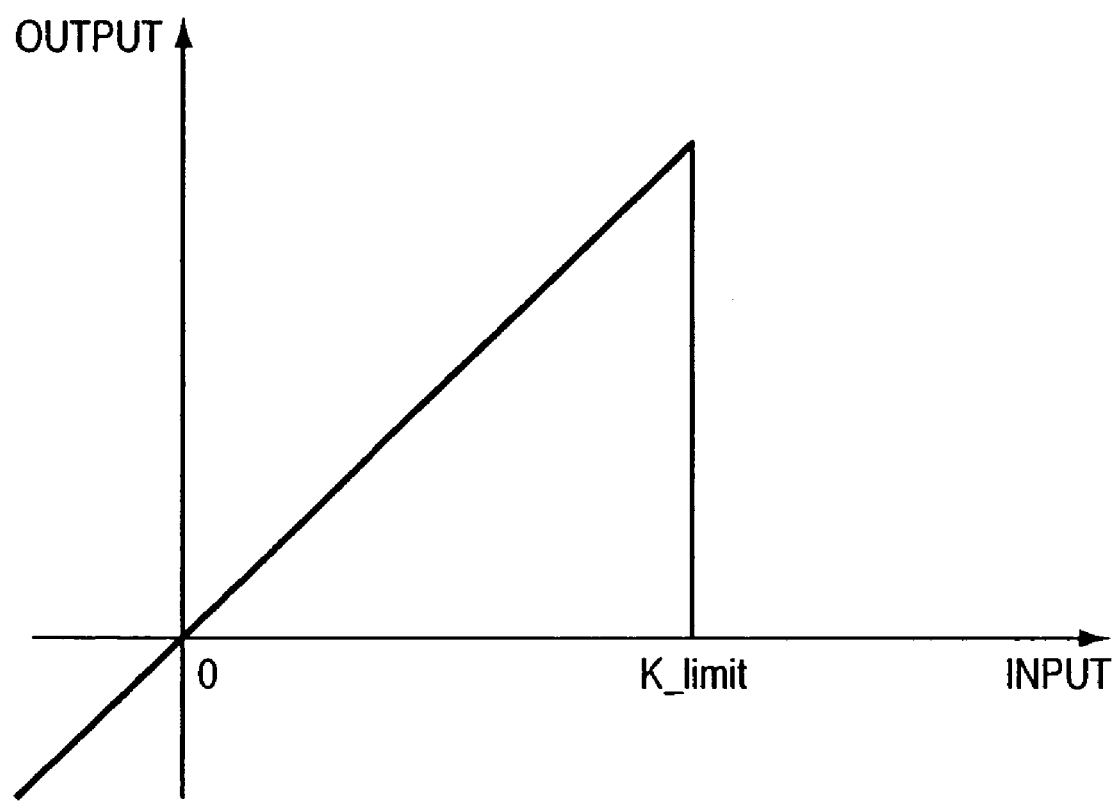
FIG. 4 is a graph showing an input/output of a correction amount limiting circuit.

As shown in FIG. 4, the correction amount limiting circuit (with a comparison device and changing device) 106 limits the correction amount output from the multiplier (calculation device) 105 not to correct the correction amount when the correction amount is larger than the predetermined value of k_limit.

A subtracter (correction device) 108 subtracts the output from the correction amount limiting circuit (with the comparison device and changing device) 106 from the input video signal. After that, a limiter 109 limits the output such that the output value falls within a predetermined signal range, and outputs the limited signal.

Assume that the TG 209 drives the CCD 202 to thin out the lines to $\frac{1}{5}$. The input video signal from the even-numbered line is obtained by two-line transfer in the vertical direction, and the input video signal from the odd-numbered line is obtained by three-line transfer in the vertical direction.

Figure 9A:
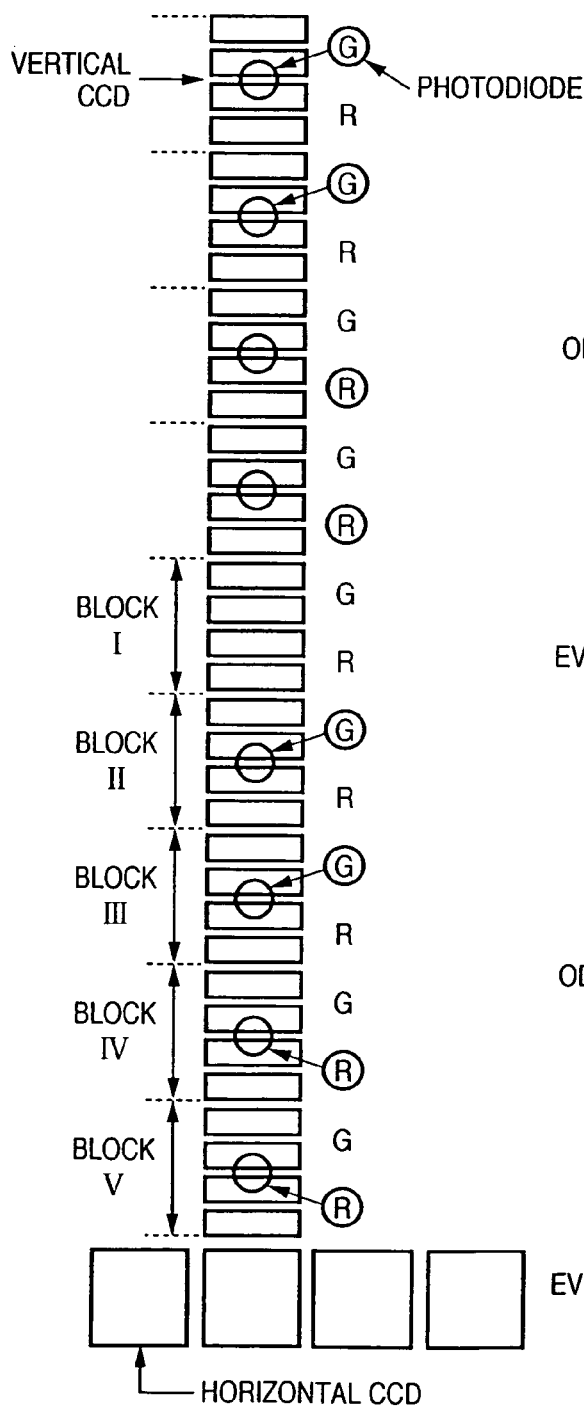
FIG. 9A is a view schematically showing a part of the CCD 202.
Figure 9B:
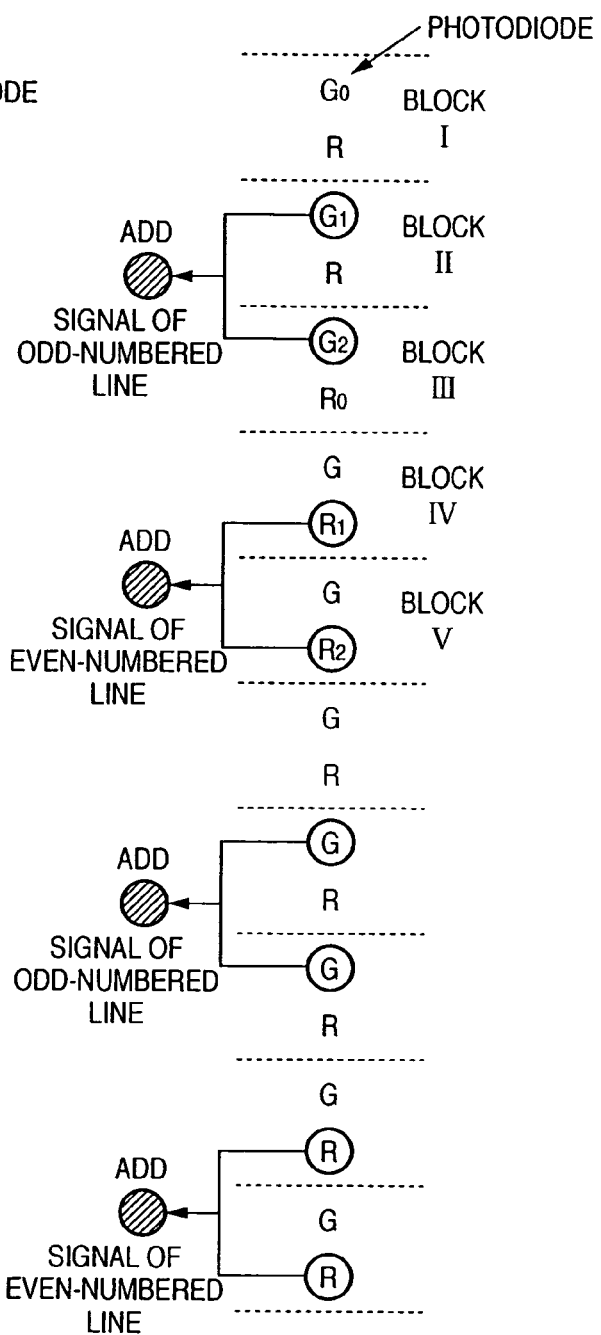
FIG. 9B is a view showing a method of outputting an image signal in thinning out lines to ⅕.

FIG. 9B shows a method of outputting an image signal in thinning out lines to $\frac{1}{5}$. When reading out all pixels, the image signals from the photodiodes G0, R, G1, R, and G2 are sequentially transferred through a vertical shift register, and output from a horizontal shift register. However, when reading the pixel signals in thinning out lines to $\frac{1}{5}$, the image signals are respectively read from the photodiodes G1 and G2 of the photodiodes G0, R, G1, R, and G2. The read image signals are added to obtain one image signal. Likewise, the image signals are respectively read from the photodiodes R1 and R2 of the photodiodes R0, G, R1, G, and R2. The read image signals are added to obtain another image signal. Assume that the above two operations are alternatively performed for each block, e.g., a block I, block II, block III, block IV, or block V which contains the photodiodes. One image signal is obtained from the blocks I, II, and III, and another image signal is obtained from the blocks IV and V. Thus, two image signals are obtained from the 10 photodiodes.

FIG. 9A is a view schematically showing a part of the CCD 202. An image signal corresponding to an object is generated in the photodiode forming the light-receiving surface of the CCD 202. The TG 209 transfers the image signal, which corresponds to the object in the photodiode, to the vertical shift register constituted by a plurality of vertical CCDs. The image signal is further transferred to the horizontal shift register constituted by a plurality of horizontal CCDs, and output from the CCD 202. Since no signal is transferred to the block I of the vertical shift register, a dummy signal is transferred instead. However, when smear occurs in a vertical line of the vertical shift register, the smear signal is transferred into each of the vertical CCDs, and output as the noise signal. Hence, when comparing the only smear components, the smear amount from the image signal (the signal from the even-numbered line) of the photodiode R obtained from signals of two blocks is different from that from the image signal (the signal from the odd-numbered line) of the photodiode G obtained from signals of three blocks.

In this driving, when the line integral circuit 101 integrates one odd-numbered line as the regions 301 and 302, the correction amount of the even-numbered line is calculated by the fixed pattern noise detected from the odd-numbered line by Gain_even=2/3
Gain_odd=1

When the line integral circuit 101 integrates one even-numbered line as the regions 301 and 302, the correction amount of the odd-numbered line is calculated by the fixed pattern noise detected from the even-numbered line by Gain_even=1
Gain_odd=3/2

When the line integral circuit 101 integrates one even-numbered line and one odd-numbered line as the regions 301 and 302, each of the correction amounts of the even- and odd-numbered lines is calculated at the same time of averaging the detected fixed pattern noise in the vertical direction by Gain_even=2/(2+3)
Gain_odd=3/(2+3)

Furthermore, assume that the TG 209 drives the CCD 202 to thin out the lines to 1/7. The input video signal from the even-numbered line is obtained by three-line transfer in the vertical direction, and the input video signal from the odd-numbered line is obtained by four-line transfer in the vertical direction. In such driving operation, when the line integral circuit 101 integrates one odd-numbered line as the regions 301 and 302, the correction amount of the even-numbered line is calculated by the fixed pattern noise detected from the odd-numbered line by Gain_even=3/4
Gain_odd=1

When the line integral circuit 101 integrates one even-numbered line as the regions 301 and 302, the correction amount of the odd-numbered line is calculated by the fixed pattern noise detected from the even-numbered line by Gain_even=1
Gain_odd=4/3

When the line integral circuit 101 integrates one even-numbered line and one odd-numbered line as the regions 301 and 302, each of the correction amounts of the even- and odd-numbered lines is calculated at the same time of averaging the detected fixed pattern noise in the vertical direction by Gain_even=3/(3+4)
Gain_odd=4/(3+4)

The above calculation result is further multiplied by the predetermined coefficient to obtain the coefficients Gain_even and Gain_odd, thereby controlling a correction degree.

That is, the multiplier 105 calculates the correction amounts of the odd- and even-numbered lines, averages the output from the line integral circuit 101 in the vertical direction, and adjusts the correction degree at the same time.

Therefore, optimal smear correction can be performed even when the smear component amounts of the even- and odd-numbered lines of the input video signal are different from each other.

Figure 6A:
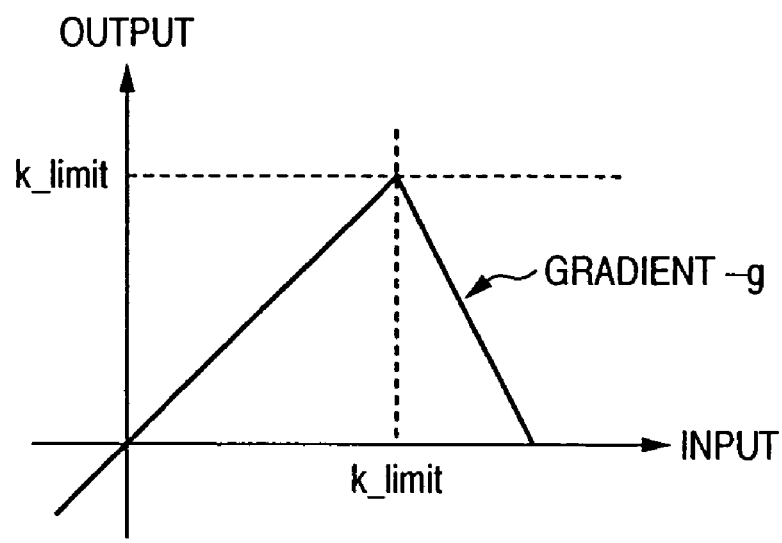
FIGS. 6A and 6B are graphs showing input/output characteristics of correction amount limiting circuits.
Figure 6B:
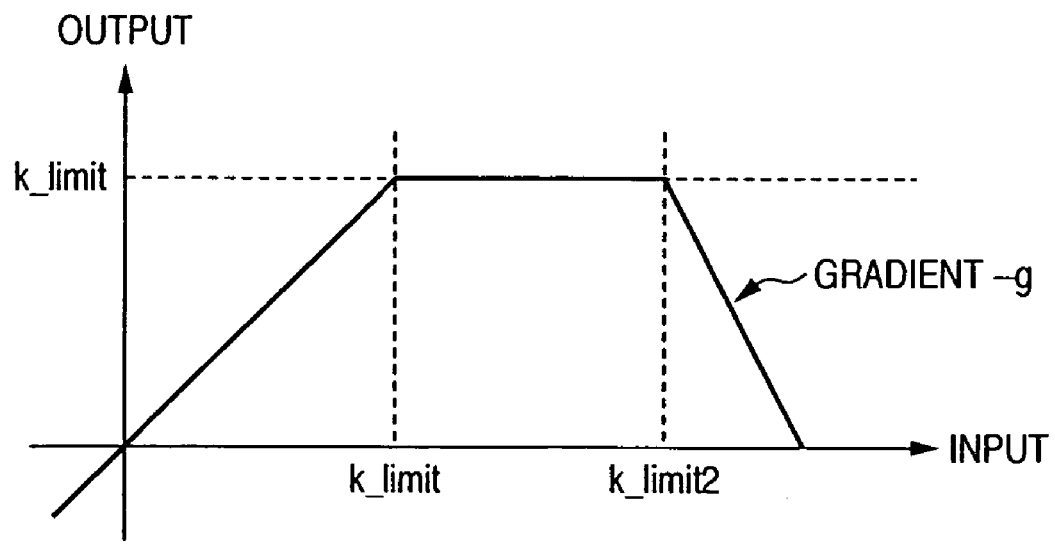

Furthermore, as characteristics, the correction amount limiting circuit 106 may gradually suppress the correction amount after the correction amount exceeds the value of k_limit as shown in FIG. 6A, or keep the upper limit of the correction amount constant between the values of k_limit and k_limit2, and suppress it from the value of k_limit2 as shown in FIG. 6B.

Figure 7:
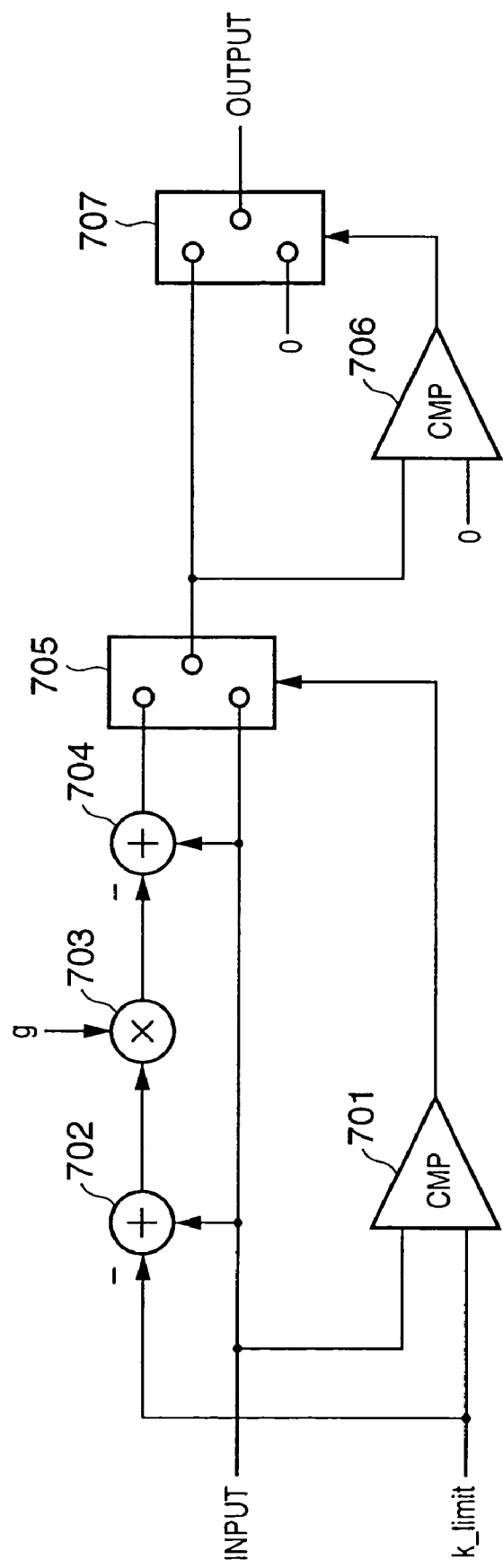
FIG. 7 is a view showing an arrangement of the correction amount limiting circuit in FIG. 6A.

FIG. 7 shows an arrangement of the correction amount limiting circuit shown in FIG. 6A. In FIG. 7, a comparator 701 compares the input value and the value of k_limit. In accordance with the output from the comparator 701, a selection circuit 705 selects the input value when the input value is smaller than the value of k_limit. Alternatively, the selection circuit 705 selects the output from a subtracter 704 when the input value is equal to or larger than the value of k_limit.

A subtracter 702 subtracts the value of k_limit from the input value. A multiplier 703 multiplies this output by g, and the subtracter 704 subtracts the multiplied output from the input value.

A comparator 706 compares the output from the selection circuit 705 and 0. In accordance with the output from the comparator 706, a selection circuit 707 selects and outputs 0 when the output from the selection circuit 705 is negative. Alternatively, the selection circuit 707 selects and outputs the output from the selection circuit 705 when the output from the selection circuit 705 is equal to or larger than 0.

Figure 8:
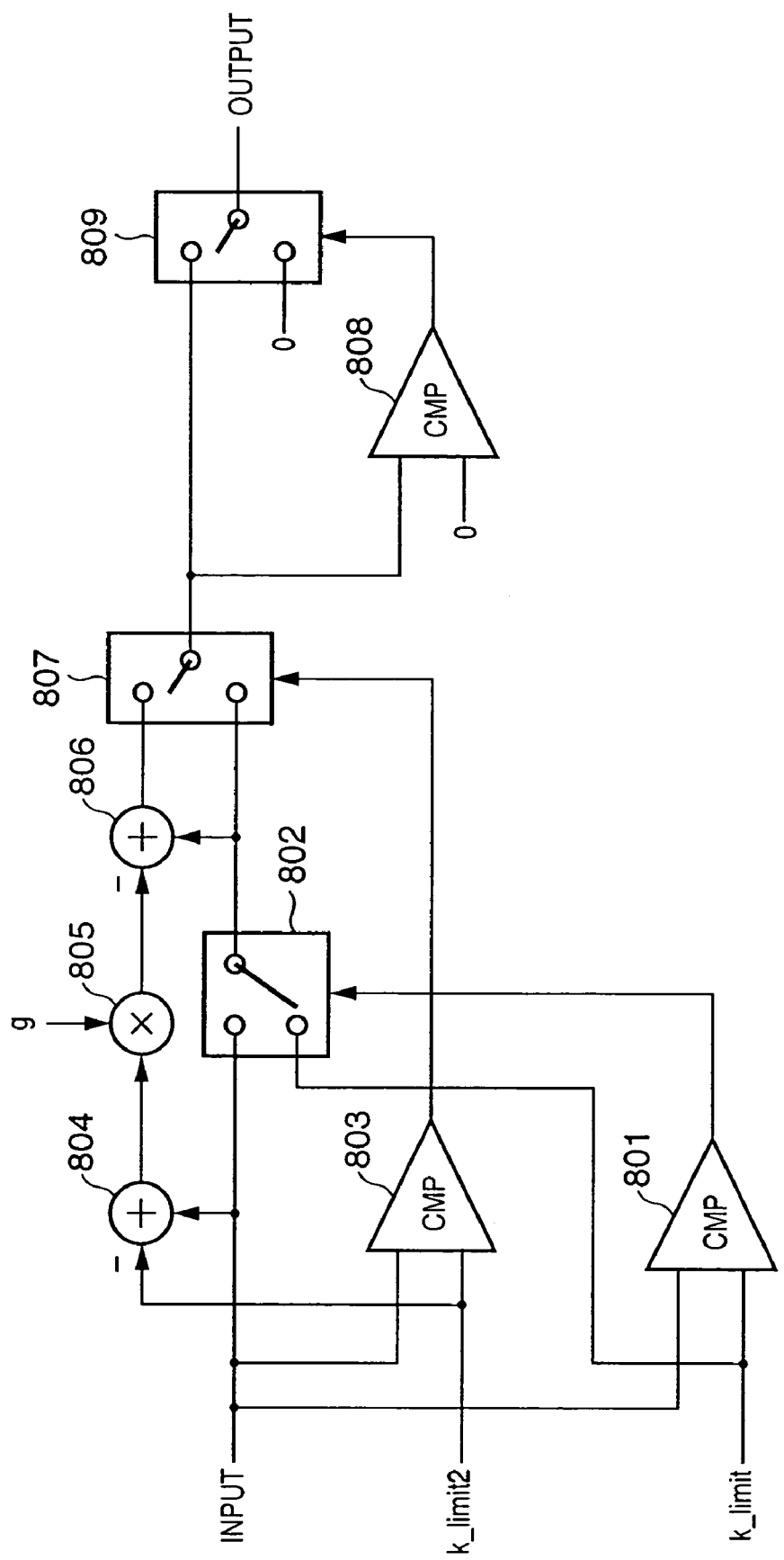
FIG. 8 is a view showing an arrangement of the correction amount limiting circuit in FIG. 6B.

FIG. 8 shows an arrangement of the correction amount limiting circuit shown in FIG. 6B.

In FIG. 8, a comparator 801 compares the input value and the value of k_limit. In accordance with the output from the comparator 801, a selection circuit 802 selects the input value when the input value is smaller than the value of k_limit. Alternatively, the selection circuit 802 selects the value of the k_limit when the input value is equal to or larger than the value of k_limit.

A comparator 803 compares the input value and the value of k_limit2. In accordance with the output from the comparator 803, a selection circuit 807 selects and outputs the output from the selection circuit 802 when the input value is smaller than the value of k_limit2. Alternatively, the selection circuit 807 selects and outputs the output from a subtracter 806 when the input value is equal to or larger than the value of k_limit2.

A subtracter 804 subtracts the value of k_limit2 from the input value. A multiplier 805 multiplies this output by g, and the subtracter 806 subtracts the multiplied output from the output from the selection circuit 802.

A comparator 808 compares the output from the selection circuit 807 and 0. In accordance with the output from the comparator 808, a selection circuit 809 selects and outputs 0 when the output from the selection circuit 807 is negative. Alternatively, the selection circuit 809 selects and outputs the output from the selection circuit 807 when the output from the selection circuit 807 is equal to or larger than 0.

Note that the smear correction has been described in the above embodiment. The vertical flaw can also be corrected accurately since the correction value of the image signal (the signal from the even-numbered line) of the photodiode R obtained from the signals of the two blocks is different from that of the image signal (the signal from the odd-numbered line) of the photodiode G obtained from the signals of the three blocks.

As described above, smear and the vertical stripe are corrected in the even- and odd-numbered lines by using the respective optimal correction values, thereby obtaining a desirable image quality.

Second Embodiment

Figure 5:
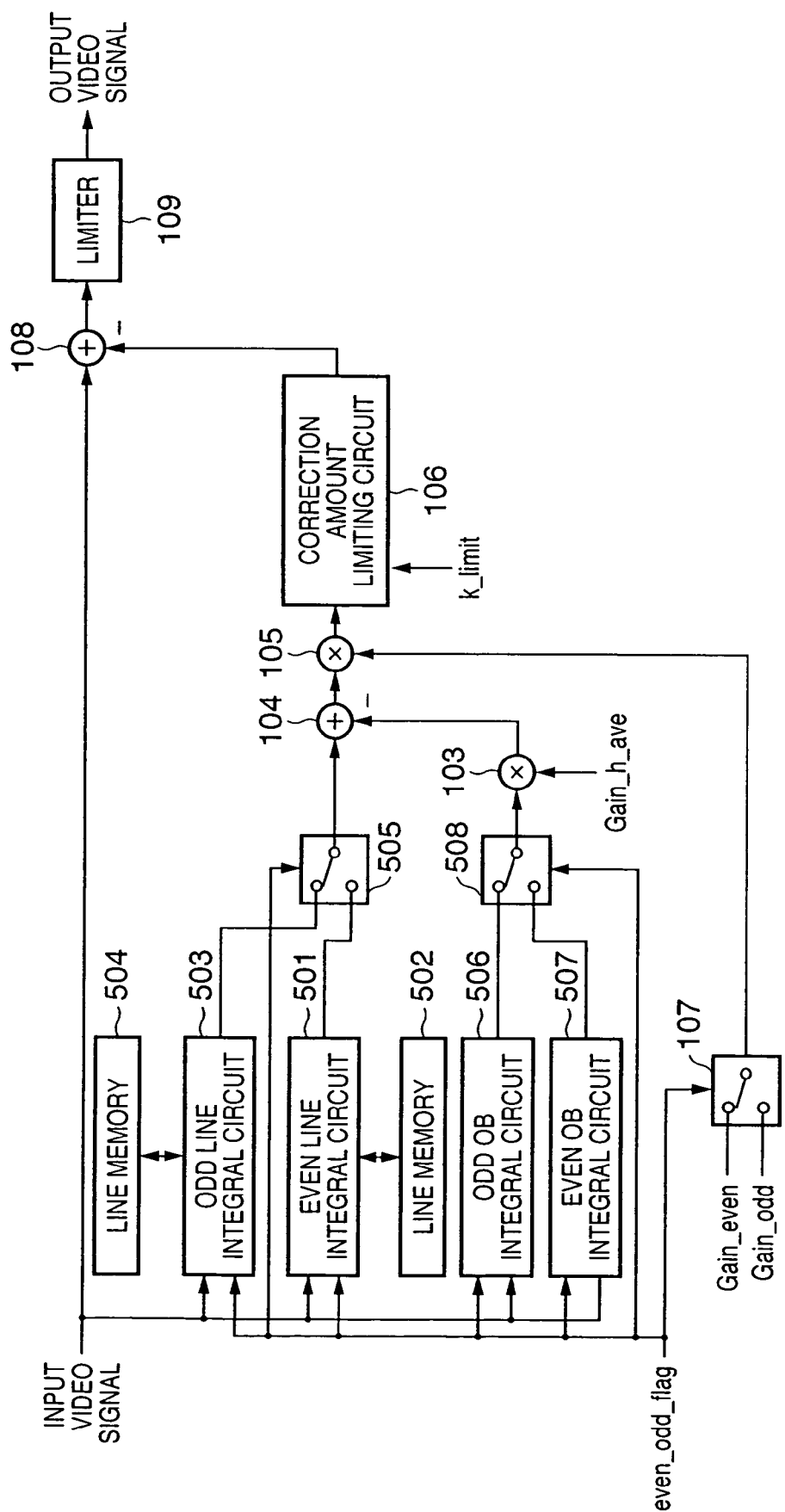
FIG. 5 is a block diagram showing an arrangement of a smear correction circuit according to the second embodiment of the present invention.

FIG. 5 is a block diagram showing an arrangement of a smear correction circuit according to the second embodiment of the present invention.

The second embodiment is different from the first embodiment in the arrangements of a line integral circuit 101 and OB integral circuit 102, and the methods of defining coefficients Gain_even and Gain_odd.

The points different from those in the first embodiment will be mainly described below.

An even line integral circuit 501 integrates an input video signal for the optically black regions 301 and 302 in FIG. 3 when a signal even_odd_flag represents an even-numbered line. A line memory 502 stores a fixed noise pattern signal of the even-numbered line.

An odd line integral circuit 503 integrates an input video signal for the optically black regions 301 and 302 in FIG. 3 when a signal even_odd_flag represents an odd-numbered line. A line memory 504 stores a fixed noise pattern signal of the odd-numbered line.

An even OB integral circuit 507 integrates the input video signal for the optically black region 302 in FIG. 3 when the signal even_odd_flag represents the even-numbered line.

An odd OB integral circuit 506 integrates the input video signal for the optically black region 302 in FIG. 3 when the signal even_odd_flag represents the odd-numbered line.

In accordance with the signal even_odd_flag, a line integral output switching circuit 505 selects the output from the even line integral circuit 501 for the even-numbered line, and the output from the odd line integral circuit 503 for the odd-numbered line. Likewise, an OB integral output switching circuit 508 selects the output from the even OB integral circuit for the even-numbered line, and the output from the odd OB integral circuit for the odd-numbered line.

Therefore, when the signal even_odd_flag represents the even-numbered line, a subtracter 104 performs optical clamping of the even-numbered line to the fixed pattern noise signal of the even-numbered line. When the signal even_odd_flag represents the odd-numbered line, the subtracter 104 performs optical clamping of the odd-numbered line to the fixed pattern noise signal of the odd-numbered line.

The coefficient Gain_even is used for averaging outputs in accordance with the number of vertical lines integrated by the even line integral circuit 501. The coefficient Gain_odd is used for averaging outputs in accordance with the number of vertical lines integrated by the odd line integral circuit 503.

For example, when the even line integral circuit 501 integrates the two even-numbered lines, the coefficient Gain_even=½.

For example, when the odd line integral circuit 503 integrates the three odd-numbered lines, the coefficient Gain_odd=⅓.

Hence, as in the first embodiment, an optimal smear correction can be performed even when the smear component amounts of the even- and odd-numbered lines of the input video signal are different from each other.

In the above description, the fixed pattern noise is detected by integrating the optically black region. However, the fixed pattern noise may be detected by integrating the region of the line which does not include an exposed video signal.

Also, in the above description, the coefficients Gain_even and Gain_odd are different. However, when driving a CCD 202 in which the number of vertical transfer stages of the even-numbered lines is the same as that of the odd-numbered lines, the correction can be performed by using the coefficients Gain_even and Gain_odd having the same value.

As described above, in the above embodiments, the solid-state image sensing apparatus which drives the CCD with the different numbers of vertical transfer stages of the even- and odd-numbered lines can extract the fixed line noise component from the output in the solid-state image sensing device, and independently adjust and correct the correction amounts of the even- and odd-numbered lines. Hence, this is effective in preferably improving the image quality degraded by a white line and the like caused by a periodic clock noise and the defect of a vertical transfer register, and the image quality degraded by the smear phenomenon.

Also, the solid-state image sensing apparatus can define the upper limit of the fixed line noise component for correction not to correct when the noise component is excessively extracted because of blooming and the like. Hence, this is effective in preferably improving the image quality by the smear correction.

Furthermore, since the limiter of the correction amount has the characteristics as shown in FIG. 6A or 6B, the correction level gradually decreases, and the continuous natural limit of the correction amount can be implemented.

As described above, in the above embodiments, the fixed line noise component is extracted from the output from the solid-state image sensing device, thereby excluding, from the correction, the noise component erroneously extracted by blooming when correcting the video signal.

Also, the better corrected image can be obtained by limiting the signal correction amount obtained from the output signal from the solid-state image sensing apparatus.

The present invention is not limited to the above embodiments and various changes and modifications can be made within the spirit and scope of the present invention. Therefore, to apprise the public of the scope of the present invention the following claims are made.

CLAIM OF PRIORITY

This application claims priority from Japanese Patent Application No. 2003-344373 filed on Oct. 2, 2003, which is hereby incorporated by reference herein.

What is claimed is:

1. An image sensing apparatus, comprising
a plurality of photo diodes arrayed on one line which include a first block consisting of a plurality of photo diodes that include first color diodes and second color diodes, and a second block consisting of a plurality of photo diodes that include the first color diodes and the second color diodes and whose number is different from a number of photo diodes in the first block;
a shift register to which signals of said plurality of photo diodes arrayed on one line are transferred;
a control circuit which transfers signals of the first color diodes in the first block to said shift register and transfers signals of the second color diodes in the second block to said shift register; and
a correction circuit which applies different correction amounts to the signals of the first color diodes transferred to said shift register and the signals of the second color diodes transferred to said shift register on the basis of a ratio of a number of photo diodes in the first block to a number of photo diodes in the second block.

2. The apparatus according to claim 1, further comprising
a comparison device which compares the correction amount and a predetermined value, and
a changing device which changes the correction amount on the basis of a comparison result from said comparison device.

3. The apparatus according to claim 1, further comprising
a lens which forms an image on said plurality of photo diodes,
an A/D converter which AID-converts the signal from said plurality of photo diodes, and
a recording control device which controls a signal output from said correction circuit to record the signal on a recording device.

4. The apparatus according to claim 1, wherein said correction circuit obtains a noise amount from an optical black area, calculates the correction amounts by multiplying variables, which are based on each number of the photo diodes in the first block and the second block, to the noise amount, and subtracts each correction amount from each of the signals of the first color diodes transferred to said shift register and the signals of the second color diodes transferred to said shift register.

5. An image sensing apparatus comprising;
a plurality of photo diodes arrayed on one line which include a first block consisting of a plurality of photo diodes and a second block consisting of a plurality of photo diodes;
a shift register to which signals of said plurality of photo diodes arrayed on one line are transferred;
a control circuit which transfers signals of a first photo diodes included in a part of the first block to said shift register and transfers signals of a second photo diodes included in a part of the second block to said shift register; and
a correction circuit which corrects a noise amount, wherein said correction circuit applies different correction amounts, which are obtained by multiplying different variables to the noise amount, for the signals transferred from the first photo diodes to said shift register and the signals transferred from the second photo diodes to said shift register on the basis of a ratio of a number of the first photo diodes to a number of all photo diodes in the first block and a ratio of a number of the second photo diodes to a number of all photo diodes in the second block.

6. The apparatus according to claim 5, further comprising
a comparison device which compares the correction amount and a predetermined value, and
a changing device which changes the correction amount on the basis of a comparison result from said comparison device.

7. The apparatus according to claim 5, further comprising
a lens which forms an image on said plurality of photo diodes,
an A/D converter which A/D converts the signal from said plurality of photo diodes, and
a recording control device which controls a signal output from said correction circuit to record the signal on a recording device.

8. The apparatus according to claim 5, wherein said correction circuit obtains the noise amount from an optical black area, calculates the correction amounts by multiplying variables, which are based on each of the ratio of the number of the first photo diodes to the number of all photo diodes in the first block and the ratio of the number of the second photo diodes to the number of all photo diodes in the second block, to the noise amount, and subtracts each correction amount from each of the signals of the first photo diodes transferred to said shift register and the signals of the second photo diodes transferred to said shift register.

* * * * *

UNITED STATES PATENT AND TRADEMARK OFFICE
CERTIFICATE OF CORRECTION

| | | |
|---|---|---|
| PATENT NO. | : 7,443,430 B2 | |
| APPLICATION NO. | : 10/957508 | |
| DATED | : October 28, 2008 | |
| INVENTOR(S) | : Hideyuki Rengakuji and Toshikazu Yanai | |

It is certified that error appears in the above-identified patent and that said Letters Patent is hereby corrected as shown below:

Column 9, claim 3, line 10, "AID-converts" should read --A/D converts--.

Signed and Sealed this

Tenth Day of February, 2009

JOHN DOLL
*Acting Director of the United States Patent and Trademark Office*